United States Patent
Chen et al.

(10) Patent No.: US 7,958,474 B2
(45) Date of Patent: Jun. 7, 2011

(54) HIGHLY THREADED STATIC TIMER

(75) Inventors: George J Chen, Union City, CA (US);
Gilda Garreton, Mountain View, CA (US); Steven M Rubin, Portola Valley, CA (US); Robert E Mains, Morgan Hill, CA (US)

(73) Assignee: Oracle America, Inc., Redwood City, CA (US)

( * ) Notice: Subject to any disclaimer, the term of this patent is extended or adjusted under 35 U.S.C. 154(b) by 435 days.

(21) Appl. No.: 12/147,418

(22) Filed: Jun. 26, 2008

(65) Prior Publication Data
US 2009/0327985 A1   Dec. 31, 2009

(51) Int. Cl.
*G06F 17/50* (2006.01)
*G06F 9/455* (2006.01)

(52) U.S. Cl. ........................ 716/108; 716/113
(58) Field of Classification Search ............ 716/108, 716/113
See application file for complete search history.

(56) References Cited

U.S. PATENT DOCUMENTS

| | | | |
|---|---|---|---|
| 4,698,760 A * | 10/1987 | Lembach et al. | 716/6 |
| 5,461,576 A * | 10/1995 | Tsay et al. | 716/6 |
| 7,191,417 B1 * | 3/2007 | Luo et al. | 716/6 |
| 7,739,098 B2 * | 6/2010 | Kucukcakar et al. | 703/19 |
| 7,797,658 B2 * | 9/2010 | Chen et al. | 716/6 |
| 2005/0172250 A1 * | 8/2005 | Kucukcakar et al. | 716/6 |
| 2008/0134117 A1 * | 6/2008 | Kalafala et al. | 716/6 |
| 2009/0106717 A1 * | 4/2009 | Chen et al. | 716/6 |
| 2009/0132981 A1 * | 5/2009 | Alpert et al. | 716/6 |

* cited by examiner

*Primary Examiner* — Stacy A Whitmore
(74) *Attorney, Agent, or Firm* — Martine Penilla & Gencarella, LLP

(57) ABSTRACT

Various methods and apparatus for executing a multithreaded algorithm that performs a static timing analysis of an integrated circuit chip (chip) include logic for traversing the chip to identify a plurality of components (cells or nodes) within a chip circuit of the chip. A waveform graph is defined for the identified nodes. One or more virtual graphs are generated from the waveform graph. The plurality of nodes in the one or more virtual graphs are processed using multiple threads to obtain quadruplet of time domain dataset values representing the different modes of propagation for each node. A timing check is performed at an end node of the virtual graphs using the quadruplet of time domain dataset values to determine any timing violation within the chip design.

26 Claims, 10 Drawing Sheets

HIGHLY THREADED STATIC TIMER

CROSS REFERENCE TO RELATED APPLICATION

This application is related to U.S. patent application Ser. No. 11/876,688, filed on Oct. 22, 2007, and entitled "MULTITHREADED STATIC TIMING ANALYSIS." The disclosure of this related application is incorporated herein by reference in its entirety for all purposes.

FIELD OF THE INVENTION

The present invention relates generally to tools used in analyzing digital circuits and, more particularly, to a static timing analysis tool for analyzing a digital circuit.

BACKGROUND

Description of the Related Art

High performance integrated circuits are extremely complex and contain an enormous amount of components (cells). Several factors have been driving the complexities. For example, factors include the demand to shrink the size of circuit features, coupled with the desire to increase the number of circuits in a particular chip area. Given these factors, the job of analyzing complex integrated circuits for acceptable design during the development phase has become tedious and time consuming. One way of analyzing integrated circuit designs is by way of measuring circuit timing to ensure that chips perform satisfactorily within certain time limits. Several tools are also used for obtaining timing measurements for determining the frequency performance of the digital circuits. One common tool is by way of a circuit simulation. However, due to the complexity of today's digital circuits, circuit simulation takes too long, rendering such tools impractical.

Another tool is a static timing analyzer (STA). STA is a technique for analyzing a circuit's frequency performance by computing the expected timing of a digital circuit without needing simulation vectors. The STA operates upon a simplified directed acyclic waveform graph to obtain accurate measurement of circuit timing and conduct constraint analysis (timing checks). The waveform graph consists of plurality of nodes and edges between the nodes. The nodes represent the input/output pins of elements and edges represent the connectivity between the pins. As designs become more complex and the design sizes increase, the graph size grows proportionately as well. This increase in graph size results in longer runtimes and larger memory requirements for the tool.

In order to do an effective timing analysis, two types of timing constraints are evaluated, a setup timing check and a hold timing check. These checks are performed by computing and comparing a set of time domain dataset values at the data pins and clock pins of clock gating circuits or storage elements, such as flip flops (flops), latches, dynamic circuits, memories, etc. Thus, timing checks are performed by comparing the arrival times of data signal at the data pins of the storage element to the arrival time of clock signal at the clock pins of the storage element. The setup timing check is performed to verify that the data signal arrives at a storage element sufficiently early to be captured correctly. To verify this check, the STA must propagate and keep the latest arrival times along the data path while keeping the earliest arrival time along the clock path. The hold timing check is performed to verify that the signal arrives at storage element sufficiently late so as not to overwrite the previous value. To verify this check, the STA must propagate and keep the earliest arrival times along the data path, but the latest arrival time along the clock path. Propagating and keeping the earliest arrival time is referred to as "early mode propagation" while propagating and keeping the latest arrival time is referred to as "late mode propagation". These early mode and late mode propagations are computed for a corner case. A corner case is defined as a set of parameters (provided by a manufacturer) that indicate the expected worse case results for circuit timing behavior across various manufacturing conditions. A timing corner case is also more commonly known as "process corner". To obtain more accurate timing analysis, the STA needs to be run for different corner cases. The time domain dataset values from all corner cases are collected and analyzed to determine the accuracy of the chip design.

Currently, in order to reduce the analysis time, the STA is implemented on multiple machines and a static timing analysis process is spawned on each of the machines to obtain the analysis results for each corner case. Since the timing constraints (setup and hold timing checks) use the early and late sets of arrival times in the computation, it is necessary to propagate both values to each node in the timing graph for each process corner. In addition, since rising and falling signals have different propagation delays, a quadruplet of time domain dataset values for the arrival time—early rise, early fall, late rise and late fall, have to be computed for each node. The timing analysis process is run sequentially on each machine using the same graph to obtain all the time domain dataset values associated with different modes of propagation for the corner case. Results from the various timing analysis are gathered and analyzed to determine any timing violation. Running the timing analysis sequentially to obtain all the time domain dataset values associated with different modes of propagation for all corner cases takes significant amount of time. In some cases, each corner case may take over 10 hours to complete the analysis. This approach of running timing analysis results in significant delay and ends up tying up multiple machine resources over an extended period of time. Further, unifying all the time domain dataset values from different timing analyses may ignore other problems, such as IO (input-output) problems, that might be encountered during analysis.

To overcome the delay experienced with sequential analysis, parallel analysis was implemented. This necessitated the STA to be installed on multiple machines and running timing analysis using the same waveform graph to obtain dataset values associated with each mode of propagation for each corner case. Thus, for instance, one machine could run the STA to obtain minimum arrival times at each node of a corner case and a second machine could run the STA at each node to obtain maximum arrival times. The minimum arrival times are used in computing the early arrival time at each node, and the maximum arrival times are used in computing the late arrival times at each node. As in the sequential analysis, the parallel analysis ends up tying up multiple machine resources over an extended period of time and might ignore other problems that might be encountered during the analysis. Thus, although the STA tool is advantageous over other tools due to its simplified approach of conducting the static timing analysis, the sequential and parallel processing using STA tool can still take a long period of time and use a lot of machine resources, rendering the tool undesirable.

It is in this context that the embodiments of the invention arise.

SUMMARY

Several distinct embodiments are presented herein as examples, including methods, and apparatus for executing a multithreaded algorithm that performs a static timing analysis of an integrated circuit chip. The multithreaded algorithm includes logic for traversing the chip to identify a plurality of components (cells or nodes) within a chip circuit of the chip. A waveform graph is defined for the identified nodes. One or more virtual graphs are generated from the waveform graph. The plurality of nodes in the virtual graphs are processed using multiple threads to obtain time domain dataset values for each node. A timing check is performed at an end node of the virtual graphs to determine any timing violation within the chip design.

The benefits of using this approach include running the timing analysis in a single process space in a processor while exploiting multithreaded features of the processor. The time domain dataset values for various modes of propagation are more efficiently shared as the multiple cores and processes for the various modes of propagation are all within the same processor. The computational resources are much more effectively utilized while significantly reducing the time taken to do the timing analysis.

It should be appreciated that the present invention can be implemented in numerous ways, such as methods, apparatus and computer readable medium. Several inventive embodiments of the present invention are described below.

In one embodiment, a method for executing a multithreaded algorithm to perform a static timing analysis of a chip is disclosed. The multithreaded algorithm includes logic for traversing the chip to identify a plurality of components within a chip circuit of the chip. Each of the components includes a plurality of nodes. A waveform graph is defined for the plurality of nodes. A first and a second virtual graph are generated from the waveform graph. The first virtual graph is assigned to run an early mode propagation and the second virtual graph is assigned to run a late mode propagation. All the nodes in the first and the second virtual graphs are processed using a first and second thread to obtain time domain dataset values for each of the nodes. Timing check is performed at an end node of the first and second virtual graph to determine any timing violation within the chip design.

In another embodiment, a method for executing a multithreaded algorithm to perform a static timing analysis of a chip is disclosed. The multithreaded algorithm includes logic for traversing the chip to identify a plurality of components with in a chip circuit of the chip. Each of the components is made up of a plurality of nodes. A waveform graph is defined for the plurality of nodes. A virtual graph is generated identifying one or more domains in the waveform graph. Each domain in the virtual graph represents a unique path of transmission of a waveform through a plurality of nodes associated with a particular header node of the waveform graph. A distinct thread is assigned to process the plurality of nodes at each domain to obtain time domain dataset values at each node within the domain. Upon completion of processing of all the nodes in all the domains, a timing check is performed to determine any timing violation within the chip circuit.

In yet another embodiment, a method for executing a multithreaded algorithm to perform a static timing analysis of a chip, is disclosed. The multithreaded algorithm includes logic to perform the static timing analysis which includes traversing the chip to identify a plurality of components within a chip circuit of the chip. Each of the components includes a plurality of nodes. A waveform graph is defined for the plurality of nodes. A first and a second virtual graph are generated from the waveform graph. Each of the first and second virtual graphs identifies one or more domains. Each domain in the first and second virtual graphs represent a signal transmission path through plurality of nodes associated with a single header node at the respective virtual graphs. The first virtual graph is assigned to run an early mode propagation and the second virtual graph is assigned to run a late mode propagation. The nodes in the first and second virtual graphs are processed using multiple threads with each thread assigned to process nodes from a single domain. Upon completion of processing of all the nodes in all the domains in both the first and second virtual graphs, a timing check is performed at an end node in the first and second virtual graphs to determine any timing violations within the chip circuit.

In another embodiment, an apparatus for executing a multithreaded algorithm to perform a static timing analysis of a chip is disclosed. The apparatus includes a chip multithreading processor and a multithreaded algorithm engine. The multithreaded algorithm engine includes an algorithm to analyze the chip in order to identify one or more components within a chip circuitry of the chip and to identify a plurality of nodes within each component. The algorithm is further used to define a waveform graph from the identified nodes and to generate a first and a second virtual graph from the waveform graph. The logic in the algorithm is used to assign the first virtual graph to run an early mode propagation and the second virtual graph to run a late mode propagation, to process all the nodes in the first and second virtual graphs using multiple threads to obtain time domain dataset values at each of the plurality of nodes and to perform a timing check to determine any timing violation within the chip circuit.

The present invention, thus, describes method and apparatuses for effectively executing a multithreaded algorithm to perform a static timing analysis of a chip. The analysis takes substantially less time while making efficient use of computational resources. Sharing of data is more efficient as multiple cores and processes used in the analysis are all in the same computing machine.

BRIEF DESCRIPTION OF THE DRAWINGS

The invention may best be understood by reference to the following description taken in conjunction with the accompanying drawings. These drawings should not be taken to limit the invention to the preferred embodiments, but are for explanation and understanding only.

DETAILED DESCRIPTION

Figure 1:
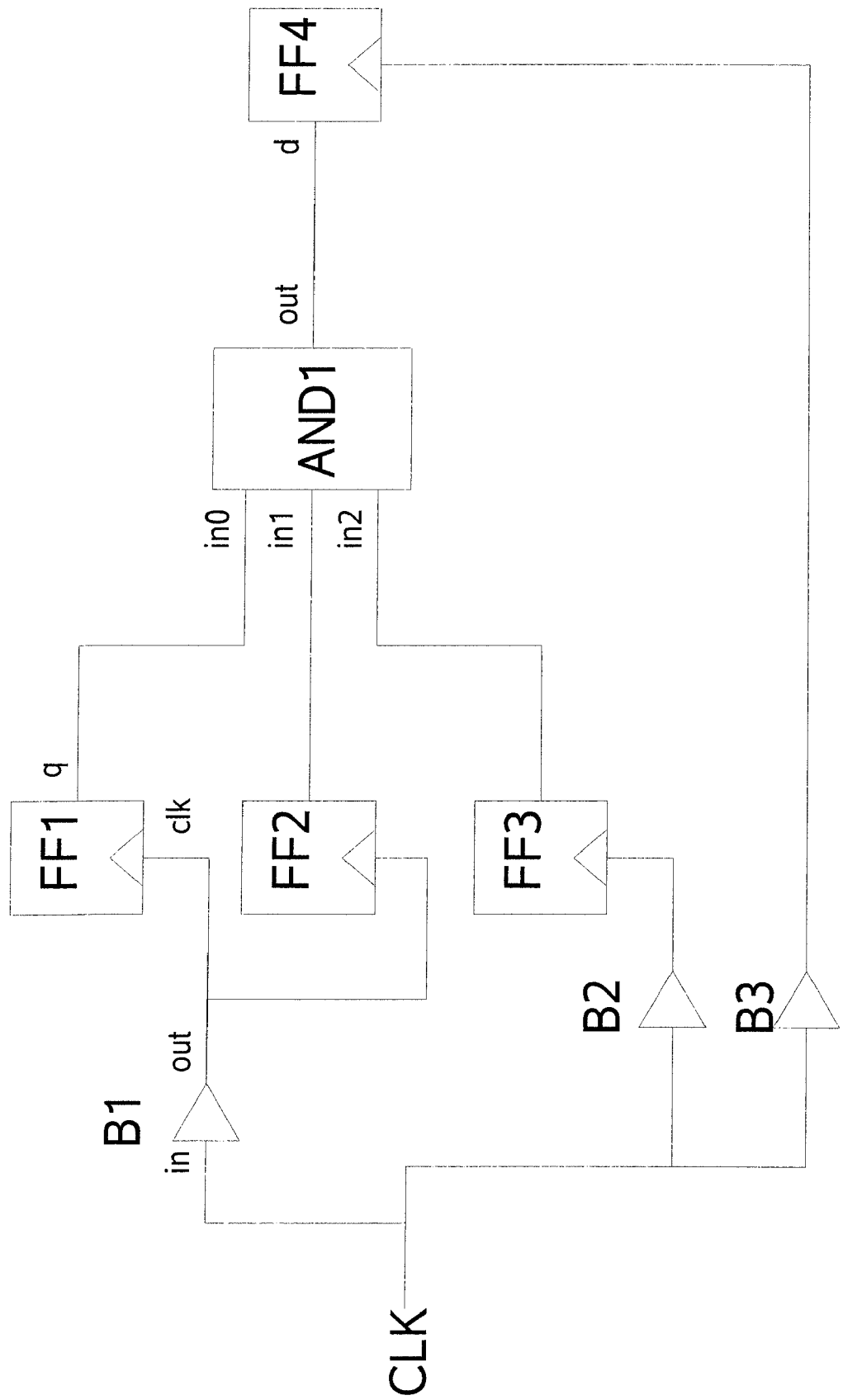
FIG. 1 illustrates a simplified sample design of a chip circuit, in one embodiment of the invention.

The present invention provides a multithreaded algorithm to effectively perform a static timing analysis of a chip. Static timing analysis is a method for finding problem areas in a chip circuit of a chip during a design phase. The chip circuit is simulated to determine if it meets the desired functionality. Generally, the static timing analysis can be run for several corner cases, such as high and low temperature, high and low voltages, and various processing conditions. To further refine the analysis and fine tune the chip design prior to fabrication, many or all of the corner cases may be run and the chip design adjusted until all the corner cases pass.

Conventional static timing analysis uses an algorithm that spawns over a plurality of machines to perform the timing analysis simultaneously for different corner cases. The results obtained from the various machines are unified and a report generated that identifies any timing violations in the chip circuit. The algorithm identifies various nodes and traces each path through a logic network of nodes and computes arrival times at each node separately for each path. As the number of paths grow exponentially with the number of nodes in the circuit, the amount of time and memory taken by the conventional static timing analysis method to process all the nodes in all the paths is considerable.

To address the delay in analyzing a circuit design of a chip, an algorithm is defined. The algorithm is designed to traverse the chip to identify a plurality of components within a chip circuit of the chip. Each of the components, in turn, includes a plurality of nodes and edges (interconnections) connecting the nodes. A waveform graph is generated from the nodes and edges. One or more virtual graphs are generated from the waveform graph. The nodes in the virtual graph(s) are processed using multiple threads to obtain time domain dataset values at each node. After processing all the nodes in the virtual graph(s), timing checks are performed at the end nodes in the virtual graph(s) using the time domain dataset values to determine if a timing violation occurred within the chip circuit. The number of timing violations would determine the level of acceptability of the chip circuit design.

The parallel processing of the nodes at the virtual graph(s) using multiple threads mitigates the delay experienced during the analysis of the chip thereby resulting in a faster analysis of the chip circuit. Further, efficient use of computational resources is achieved as the timing analysis is performed by exploiting the multithreading capability of a processor. Sharing of data amongst various computations running in the processor is easily effectuated as all the computations are done in a single process (address space).

To facilitate an understanding of the various embodiments, a simplified sample chip circuit of a chip will be described first. The features of the disclosed embodiments will then be described with reference to the sample chip circuit. The present invention is not restricted to the simplified chip circuit but can be extended to any type of complex chip circuit. With this understanding in mind, it should be appreciated that the present invention can be implemented in different ways such as apparatuses and methods. It will be apparent to those skilled in the art that the present invention may be practiced without some or all of the specific details set forth herein.

FIG. 1 illustrates a simplified version of a sample design circuitry of a chip. The design includes a plurality of logic components and their interconnections that make up the chip or section of a chip. The logic components in the design circuitry of the chip include three buffers, B1, B2, B3, an AND gate, AND1, and four flip flops, FF1, FF2, FF3 and FF4, respectively. In reality, a design circuit of a chip can contain anywhere from one to millions of logic components such as logic gates, buffers, inverters, flip-flops, multiplexors, etc. The inputs and outputs of each of the buffers B1-B3 are named "in" and "out" as shown with respect to buffer B1 and the input pins of the logic component, AND1, are labeled "in0", "in1" and "in2", respectively. A clock signal, CLK, provides clock timing for a signal to pass through the various logic components of the design circuitry.

The algorithm traverses the chip design and generates a waveform graph representing various nodes and edges that make up the chip design. As mentioned earlier, a generic chip circuit includes a multitude of the components represented in FIG. 1 and the algorithm identifies each of the components and establishes nodes associated with each of the components in the waveform graph. It is noteworthy that the present invention is not limited to the architecture of FIG. 1. Typically, the chip circuit design is more complex than the one illustrated in FIG. 1 with each chip design including a multitude of various components including the ones illustrated in FIG. 1. Thus, the embodiment illustrated in FIG. 1 must be considered exemplary and not representative of a chip design of a chip.

Figure 2:
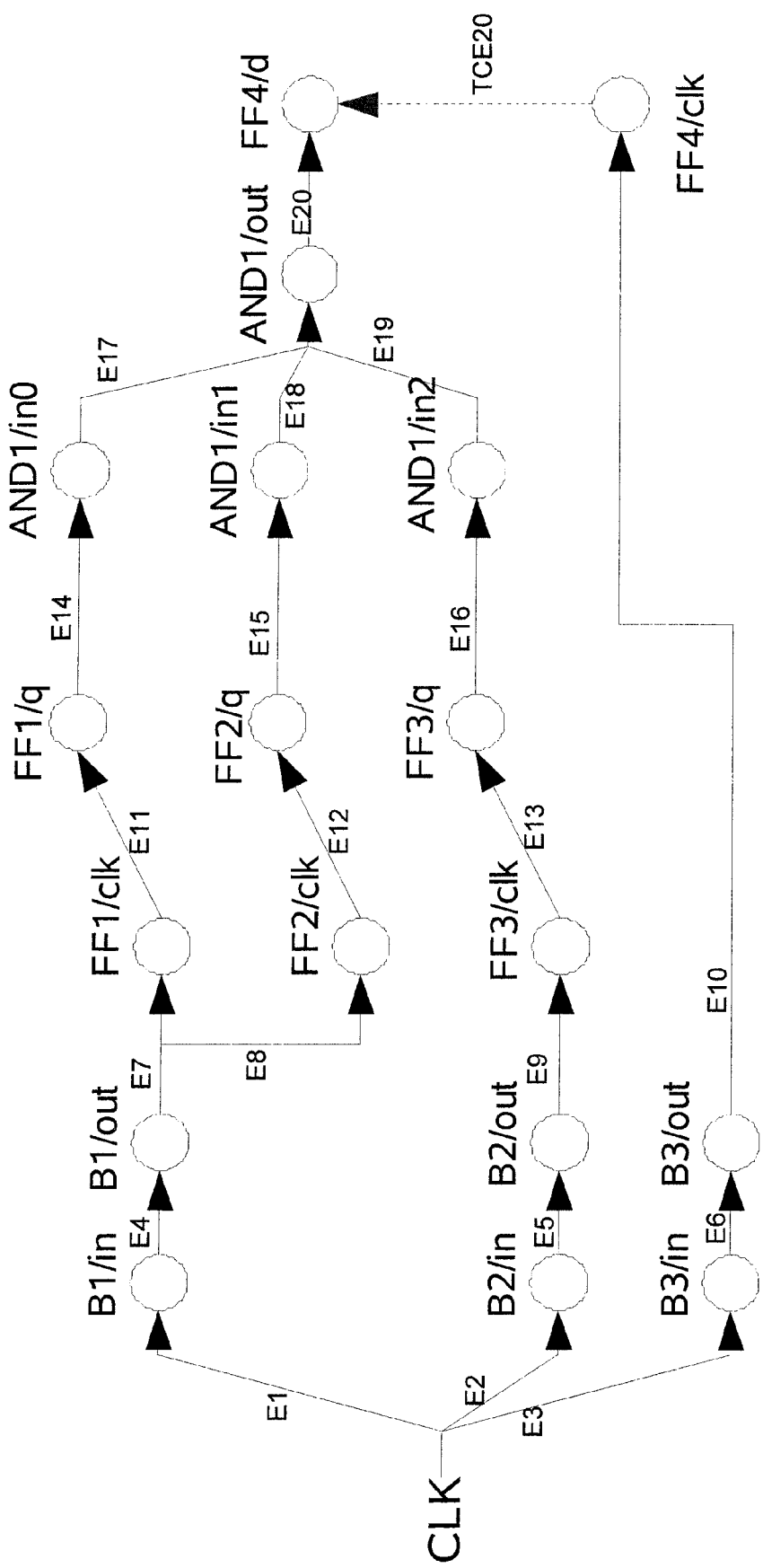
FIG. 2 illustrates a sample waveform graph derived for the sample design of a chip circuit illustrated in FIG. 1, in one embodiment of the invention.

FIG. 2 illustrates a sample waveform graph of the chip design circuit represented in FIG. 1. The waveform graph of the chip design circuit is modeled as a directed acyclic graph. As can be seen, the components represented in FIG. 1 are associated with a plurality of nodes and edges in FIG. 2. The nodes represent an instance of a logic element or a collection of logic elements having an associated logic function. Each node, therefore, may represent either an input pin or an output pin of each component in the chip design. For instance, component buffer, B1, of FIG. 1 is represented by two nodes, B1/in and B1/out representing the input and output pins to buffer B1. The edges represent connectivity between the nodes. Internal paths of each instance of a logic element, which represent sensitizable paths, are derived from a timing rule (timing abstract), and are designated as edges as well. As illustrated in FIG. 2, edges E1-E20 represent propagation edges that connect respective nodes of components and edge TCE20 represents a special edge over which a timing check is performed between end nodes FF4/d and FF4/clk. The timing check will determine whether the particular chip design, being analyzed using the multithreaded algorithm, violates any timing criterion established for the chip circuit.

The multithreaded algorithm may obtain the list of components by analyzing an actual chip design or from a plurality of files and generate a corresponding waveform graph. In cases where the list of components is obtained from a plurality of files, design model information may be obtained from a design model file. Similarly, list of components and connectivity information, such as gates and connectivity between gates, may be obtained from a structural or design netlist and parasitic information, such as Resistor-Capacitor connection information may be obtained from a separate parasitic information file or from the structural/design netlist. Along the same lines, technology information may be obtained from a technology information file and timing delay, such as delay from one point to another point that may or may not be specific to a particular component, may be obtained from timing model file. External constraints that control what data to read, clock frequency for the particular chip design, etc., may be obtained from a tool command language (tcl command) file. The external constraints and input data are all obtained prior to the processing of nodes. Referring back to FIG. 2, the multithreaded algorithm computes the timing delay at each node by using the input from the timing model file and the clock frequency associated with a particular chip design.

Typically, the multithreaded algorithm works by propagating arrival times forward from CLK node to an end node (e.g. FF4/d) in the waveform graph and then flipping the waveform graph and propagating required times from the end node back to the CLK node using multiple threads. After all the arrival times at the nodes have been computed, a timing check is done at a storage element, such as a flop. After the timing check at the flop, a corresponding required time is computed at the flop and propagated backwards from the flop to the CLK pin. Thus, all the nodes in the chip circuit illustrated in FIG. 2 are first processed by computing and propagating arrival times forward at each node, a timing check is performed at an end node, such as the data input pin of the flop, FF4/d, corresponding required time is computed at the flop, FF4/d, and the nodes in the waveform graph are processed to compute required times at each node by propagating the required times backwards from the FF4/d data pin to the clock pin, CLK.

Figure 3:
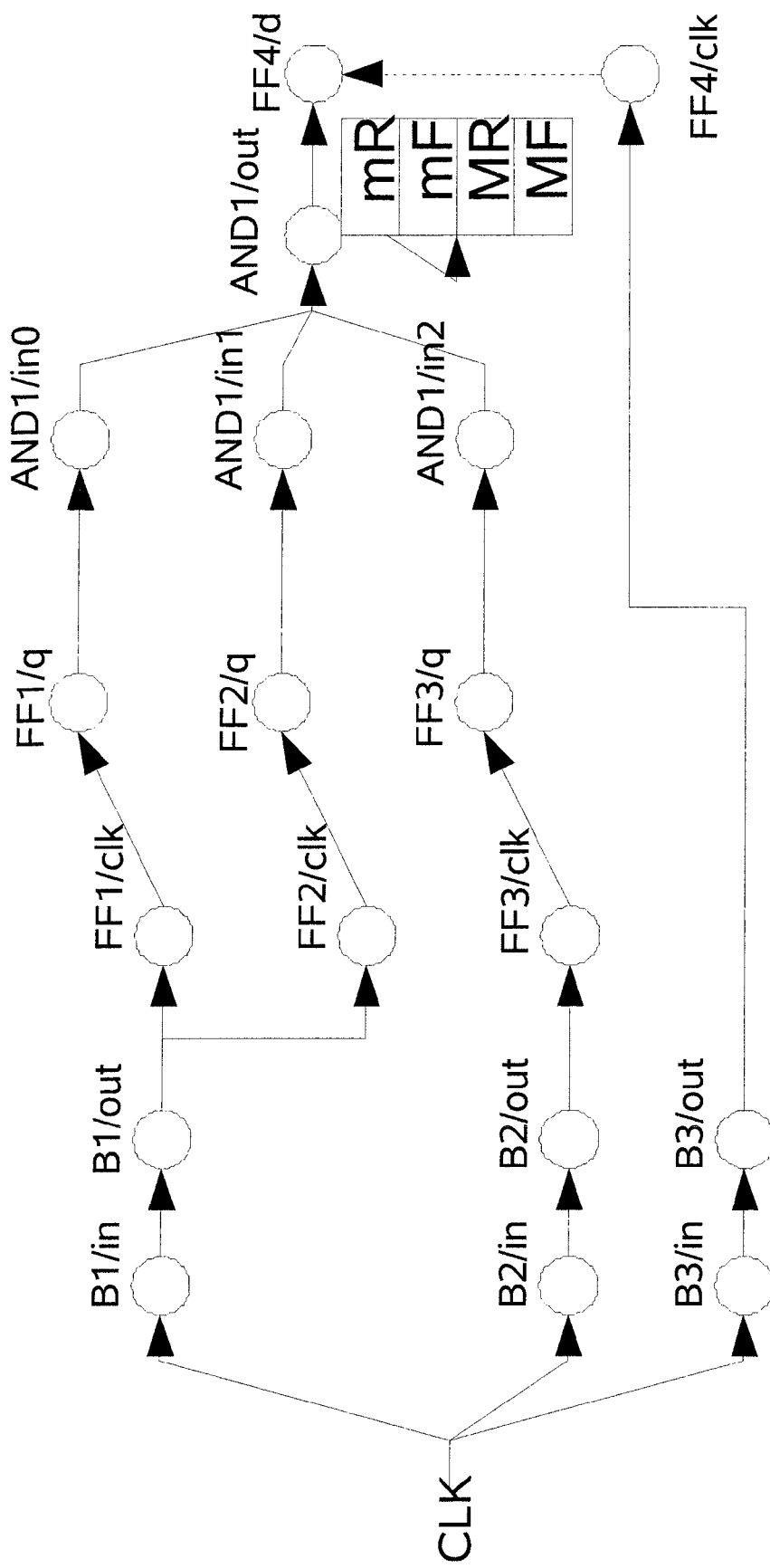
FIG. 3 illustrates computed arrival time and timing check for the sample waveform graph of a chip circuit illustrated in FIG. 2, in one embodiment of the invention.

In order to compute setup and hold timing checks at the data input pin of the flop, FF4/d, both early mode and late mode arrival times are required. As a result, each node in the waveform graph is processed so as to obtain both early mode arrival time and late mode arrival time. The processing at each node is by capturing the different waveform signals. Considering different propagation delay of rising and falling waveform signals along the waveform graph, a quadruplet of time domain dataset values are captured at each node in order to compute early mode and late mode arrival times. The quadruplet of time domain dataset values (quadruplet of values or quadruplet values) at each node identifies the four different waveforms representing the two modes of computing. The quadruplet of values includes early rising, early falling, late rising and late falling represented as mR ("min rising"), mF ("min falling"), MR ("max rising"), MF ("max falling"). FIG. 3 illustrates the result of one such computation at the data input pin of the flop, FF4/d, in one embodiment of the invention. The arrival times are calculated one node at a time before proceeding to the next node and the quadruplet value at each node is captured in a bucket. The values in the bucket at each node are filled as each mode of propagation is computed. Additionally, the bucket includes values from both forward propagation and backward propagation and hence, includes not only the quadruplet values for computing arrival times but also the required time.

The min-mode values and the max-mode values of a current node are dependent on the respective mode values of a preceding node, thereby establishing a node-to-node dependency. When a current node is the first node in the branch, the arrival time at the current node is based on the launch time of the clock signal at the launch node, such as CLK. Since the clock signal launches both the data and clock signals along the components of the chip, the corresponding launch time (arrival time) at the launch node is considered while computing the arrival time for the current node. Typically, the launch time is a user-specified time.

It should be noted that a node can have more than one time domain dataset values. This might be due to certain analysis requirements, such as handling multiple clock skews, handling false paths, handling asynchronous clocks, or handling multi-cycle constraints. The quadruplet of values computed at each node is specific for a corner case. If more than one corner case is considered during timing analysis, so as to further fine tune the chip circuit design, each node will have quadruplet of values corresponding to each corner case.

Further, the min rising value may affect min falling value and max rising value may affect max falling value thereby establishing a mode-wise dependency. Thus, during mode propagation (min-mode and max-mode) at each node, min-mode values (min rising and min falling) interact with each other, i.e., min rising will affect min falling and min falling refers to min rising or vice versa. Similarly, max-mode values (max rising and max falling) will interact with each other. However, there is very little interaction between min-mode values and max-mode values at each node of the waveform graph except at an end-node during timing check when cross computation of modes is performed to compute setup timing and hold timing.

To fully take advantage of the multithreading capability of a processor running the timing analysis, the multithreaded algorithm uses two different evaluation schemes to perform the timing analysis—mode-wise evaluation and domain-wise evaluation. In the mode-wise evaluation, the min-mode values and max-mode values are independently computed using multiple threads. This is accomplished by using two instances of the waveform graph and assigning distinct threads to calculate the time domain dataset values associated with each node. In the domain-wise evaluation, the time domain dataset values are computed by generating a virtual graph that identifies the various domains within the waveform graph and using multiple threads to process the nodes in each domain.

Figure 4:
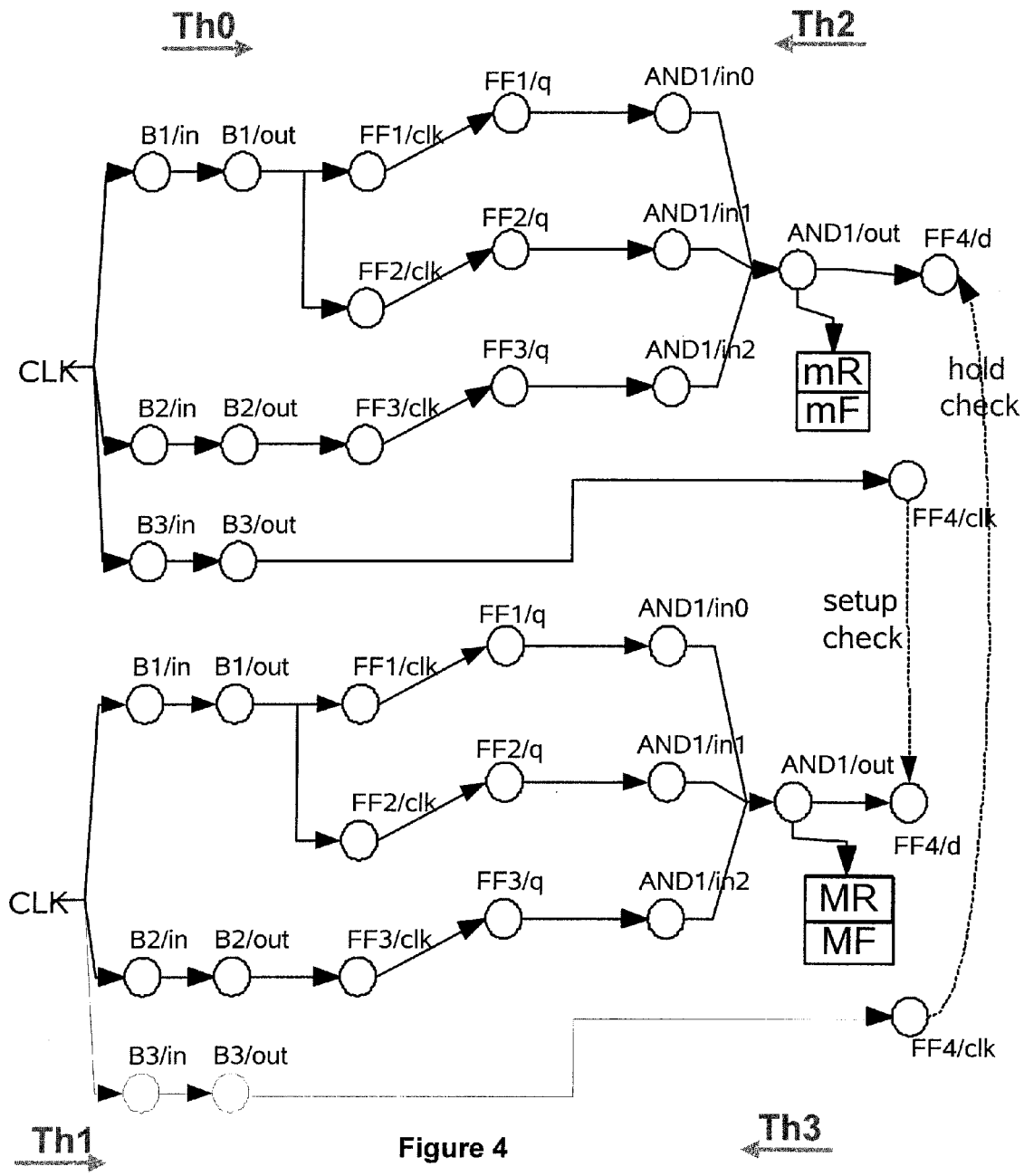
FIG. 4 illustrates simplified first and second virtual timing graphs derived from the sample waveform graph of a chip circuit illustrated in FIG. 2, in one embodiment of the invention.

Considering the mode-wise evaluation scheme, the min-mode values and max-mode values are computed independently by generating two virtual graphs, first and second virtual graph, as illustrated in FIG. 4, in one embodiment of the invention. In one embodiment, the first virtual graph is assigned exclusively for computing min-mode values and the second virtual graph is assigned exclusively for computing max-mode values. Distinct threads are assigned to independently process nodes in the first and second virtual graphs. As a result, a first thread Th0 is assigned to compute the min-mode values using the first virtual graph and a second thread Th1 is assigned to compute the max-mode values using the second virtual graph, as shown in FIG. 4. It should be noted that the min-mode values and max-mode values for each node includes corresponding arrival time. Aside from the two different mode arrival times, each node includes a required time as well. And, in order to compute required time using backward propagation, two additional threads, Th2 and Th3, may be engaged to independently process the nodes in the first and second virtual graph, respectively. In this embodiment, the first two threads, Th0 and Th1, are discarded after the computation of the arrival times and completion of timing check. In another embodiment, Th0 and Th1 may be used for both forward propagation and backward propagation. The multithreaded algorithm waits till all the nodes in both the first and second virtual graph are processed during forward propagation before performing a timing check at an end node in the first and second virtual graph. The backward propagation is performed after the timing check is completed. The forward propagation threads execute concurrently while the forward and backward propagation threads are executed sequentially. Thus, in the above embodiments, Th0, Th1 are executed concurrently while Th0, Th2 or Th1, Th3 are executed sequentially. The above two embodiments have been described with reference to processing of nodes associated with a single domain for a single corner case.

If more than one corner case is to be processed at a given time, a plurality of virtual graphs are generated corresponding to the number of corner cases with each virtual graph used to perform either a min-mode or max-mode processing for each corner case and distinct threads are assigned to process the nodes in each virtual graph. Thus, for instance, in order to process six corner cases, a total of twelve virtual graphs are generated with the first six graphs assigned to process the min-mode and the remaining six virtual graphs assigned to process the max-mode for each of the six corner cases and 12 threads are assigned to process the nodes with each thread assigned to a distinct virtual graph. By assigning multiple threads to process the min-mode and max-mode and additional threads to process backward propagation, the timing analysis is performed in substantially less time while saving considerable computational resources.

During node processing, when more than one edge converges into a node, then the multithreaded algorithm performs automatic pruning of one or more of the quadruplet values associated with converging nodes. The multithreaded algorithm includes logic to identify a plurality of nodes from which more than one edge converges. The node into which the edges converge is the convergence node and the nodes associated with the edges that converge into the convergence node are the converging nodes. The algorithm then compares the quadruplet values associated with the converging nodes to identify a worse case dataset value. For an early mode propagation for computing arrival time, the worse case time domain dataset value would be a value associated with the earliest computed arrival time while for a late mode propagation for computing arrival time, the worse case value would be a value associated with the latest computed arrival time. Since, the computation of early mode values at a node depends only on the early mode values of its predecessor nodes and the computation of late mode values at a node depends only on the late mode values of its predecessor nodes, the algorithm may effectively be used to take advantage of this computational dependency to apply multithreading efficiently during the timing analysis. During processing, the algorithm retains the worse case values for the quadruplet and automatically prunes the remaining values at the convergence node. The pruned values are not included in computing subsequent nodes mode arrival times.

Upon completion of processing of all the nodes in the first and second virtual graph, a timing check is performed at an end node associated with each of the first and the second virtual graph to determine setup and hold timing check. The setup and hold timing checks at the respective end nodes are performed by exchanging information between the end nodes of different modes. Thus, to obtain a setup timing check, the latest arrival time information (MR and MF) along the data path is used along with the earliest arrival time information (mR and mF) along the clock path. Similarly, to obtain the hold timing check, the earliest arrival time information (mR and mF) along the data path is used along with the latest arrival time information (MR and MF) along the clock path, as illustrated in FIG. 4. In one embodiment, Th0 is used to compute the hold timing check and Th1 is used to compute the setup timing check. Once the timing checks have been completed, the two threads, Th0 and Th1, may be discarded or may be further used to compute required time at each node using backward propagation of waveforms.

Figure 5:
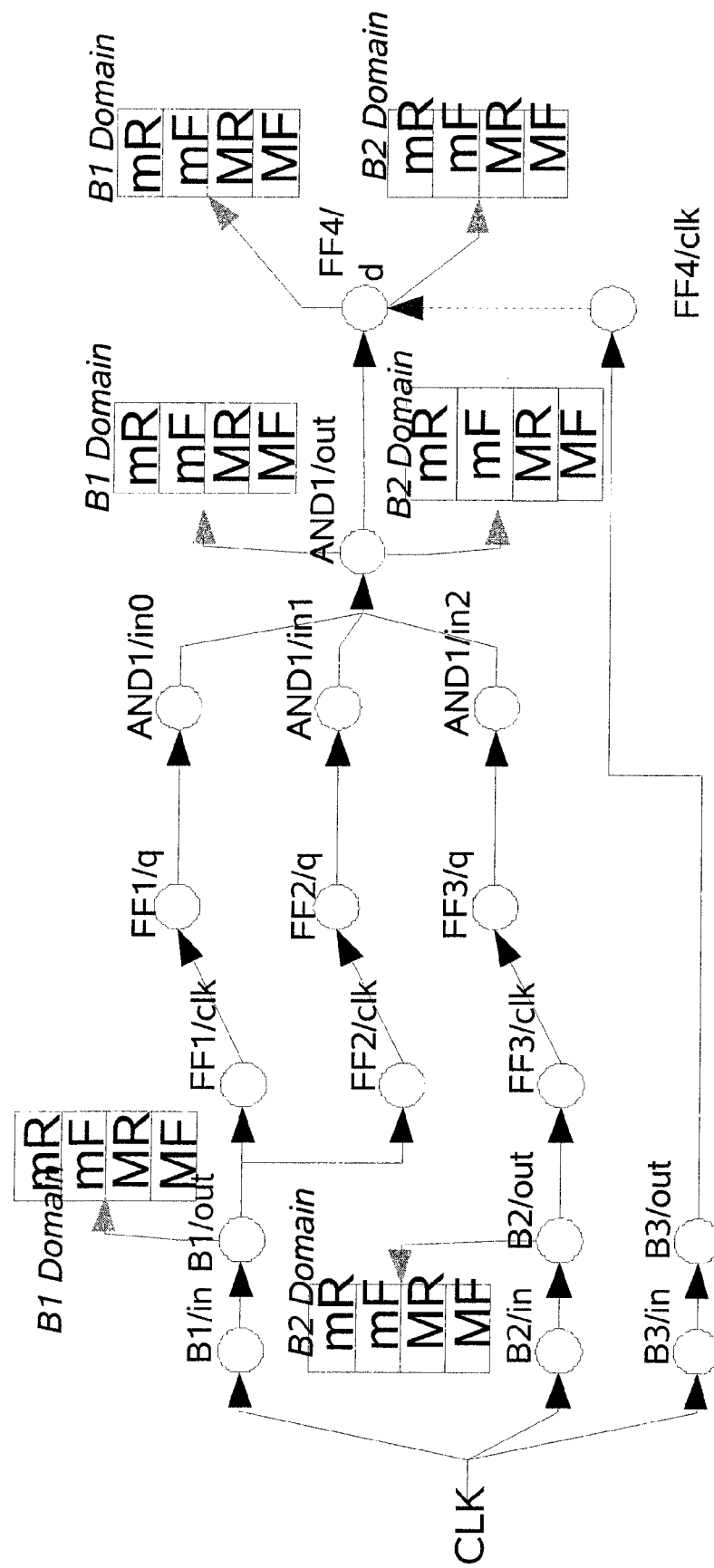
FIG. 5 illustrates various domains associated with the sample waveform graph illustrated in FIG. 2, in one embodiment of the invention.

For performing timing analysis using a domain-wise evaluation scheme, the waveform graph is used to generate a virtual graph identifying various domains within the waveform graph, as illustrated in FIG. 5, in one embodiment of the invention. This embodiment depicts the domain-wise evaluation for analyzing multiple skew regions. A skew is defined as an adjustment to the arrival time during setup timing or hold timing computation and a skew region may be a convergence node location that is associated with a plurality of arrival times, one or more of which may be considered in arriving at a setup timing or hold timing computation. The skew adjustment is based on some pre-set criteria. In one embodiment, the pre-set criteria may be based on pair-wise combination of last clock buffers passed through by both the data and clock paths. For the embodiment illustrated in FIG. 5, the last clock buffer that a clock path ending in FF4/clk passed through was buffer B3 and the last data buffer that the data path ending in FF4/d passed through could be one of B1 or B2. The skew adjustment is based on which data buffer is considered during setup timing or hold timing check. FIG. 5 illustrates the multiple skew regions at nodes AND1/out and FF4/d with each node associated with a number of quadruplet value sets based on the number of data paths passing through the last buffer. To enable keeping a skew region's quadruplet values distinct, each of the quadruplet values for a node associated with the skew region is tagged with the last buffer information associated with the node.

When more than one path passes through a buffer and converges to a convergence node, the quadruplet values are pruned such that only one set of quadruplet value is associated with each domain and the nodes preceding the convergence node would have quadruplet values attached to only a single domain. This is done by comparing the tagged information associated with the multiple quadruplet values at the convergence node and then pruning the multiple quadruplet values only when the tagged information is the same. Thus, as shown in FIG. 5, node AND1/out includes two sets of quadruplet values from domain B1 and one set of quadruplet values from domain B2. The two sets of quadruplet values with B1 domain tag are pruned to allow only a single set of quadruplet values associated with B1 domain. The pruning of the multiple quadruplet values within the B1 domain are done in such a way that the node with worse case quadruplet values is retained for the domain. The resulting virtual graph can be processed using multiple threads with each thread assigned to process nodes in a distinct domain.

Figure 6:
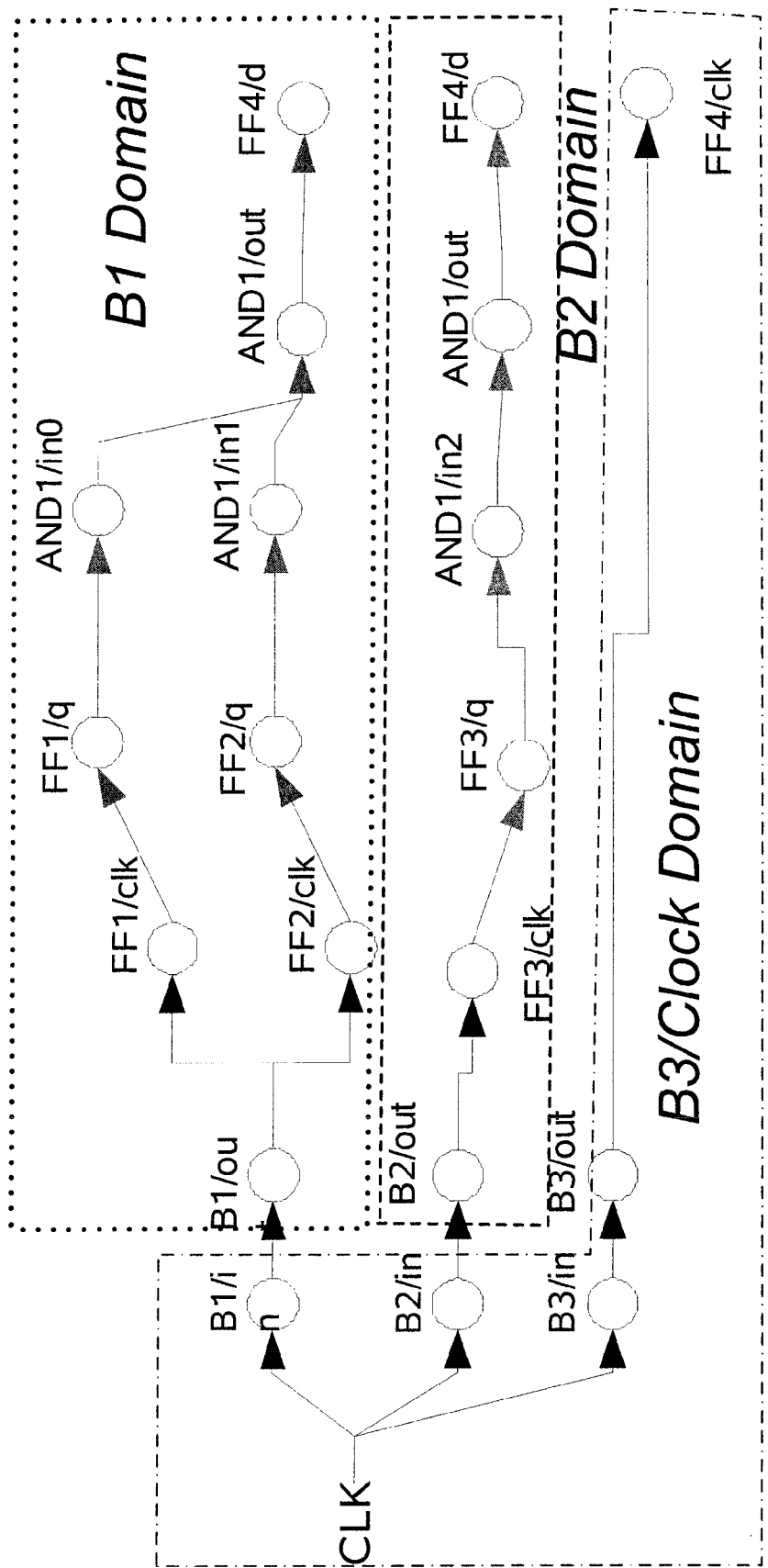
FIG. 6 illustrates a simplified virtual graph identifying multiple domains derived from the sample waveform graph of a chip circuit illustrated in FIG. 2, in one embodiment of the invention.

The algorithm uses the tagged quadruplet values to generate a plurality of domain-wise virtual graphs, as illustrated in FIG. 6. The domain-wise virtual graphs identify the plurality of domains, with each domain having a plurality of nodes, with each node's quadruplet value tagged with the associated domain. Thus, as shown in FIG. 6, the sample waveform graph of FIG. 2 is used to provide a virtual graph with 3 domains, B1 domain, B2 domain and B3 domain. The nodes in each domain are distinct except at the point of convergence. When two nodes from two different domains are converging at a convergence node, each domain's virtual graph will include the convergence node information. Thus, the virtual graphs for B1 domain and B2 domain will include convergence nodes AND1/out and FF4/d as the convergence nodes AND1/out and FF4/d include quadruplet values with tags in both B1 domain and B2 domain. The B3 domain is a "Clock domain" and covers all the nodes in the clock-tree. The clock tree includes nodes CLK, B1/in, B2/in, B3/in and FF4/clk. During domain-wise evaluation, the clock domain is first propagated before all other domains are propagated since all other domains are dependent upon the clock domain information for computing the different mode values. After the clock domain computation, other domains are computed in parallel using multiple threads during arrival time propagation. Upon computation of arrival time, the required time propagation may proceed in parallel for all the domains using multiple threads. The same set of multiple threads used in arrival time propagation may be used for required time propagation or a different set of multiple threads may be used. Thus, the domain-wise evaluation provides the ability to use multithreaded algorithm to perform the analysis at substantially less time using considerably less computational resources making this algorithm very efficient in timing analysis.

In yet another embodiment, both the mode-wise evaluation and domain-wise evaluation schemes discussed above are combined for the timing analysis. According to this embodiment, the waveform graph is used to generate a first virtual graph and a second virtual graph. The first virtual graph is assigned to compute early mode propagation and the second virtual graph is assigned to compute late mode propagation. The first and second virtual graphs are each traversed to identify a plurality of domains. The plurality of domains in each of the first and second virtual graphs are processed using multiple threads. When a convergence node is detected at the first and second virtual graphs, the quadruplet values at the convergence node are analyzed to determine if they belong to the same domain. If they belong to the same domain, the quadruplet values are pruned such that only the worse case of quadruplet values for each propagation mode are retained as explained in detail with reference to mode-wise propagation and domain-wise propagation. The processing of the nodes include both forward propagation to compute arrival times and backward propagation to compute required times. The clock domain is processed in the first and second virtual graphs before the domains in the first and second virtual graphs are processed in parallel. The above embodiments are associated with a single corner case. If more than one corner case needs to be processed, plurality of virtual graphs associated with each corner case is generated and nodes processed for each corner case.

Once all the nodes in all the branches are computed, a timing check is performed along a timing check edge to determine if the circuit design passes the timing check or not. The timing check is performed by exchanging information from different modes between the data input pin (flip flop node FF4/d) and the clock pin (node FF4/clk), along a timing check edge TCE20. Thus, the setup timing is computed using the latest arrival times along the data path from the late mode propagation and the earliest arrival time along the clock path from the early mode propagation and the hold timing check is computed using the earliest arrival times along the data path from the early mode propagation but the latest arrival time along the clock path from the late mode propagation.

To further analyze the circuit design, the static timing analysis algorithm inverts the waveform graph and computes the required times at each node by traversing backwards on the waveform graph. A required time is defined as the time a data is expected to arrive at a particular node based on a clock cycle. The required time is not mode dependent and is a single value for each node. The timing analysis algorithm engages a plurality of threads to compute the required time at each of the domains in the virtual graph. The timing analysis algorithm uses both the arrival time and required time in the timing analysis to determine the validity of the chip design.

Figure 7:
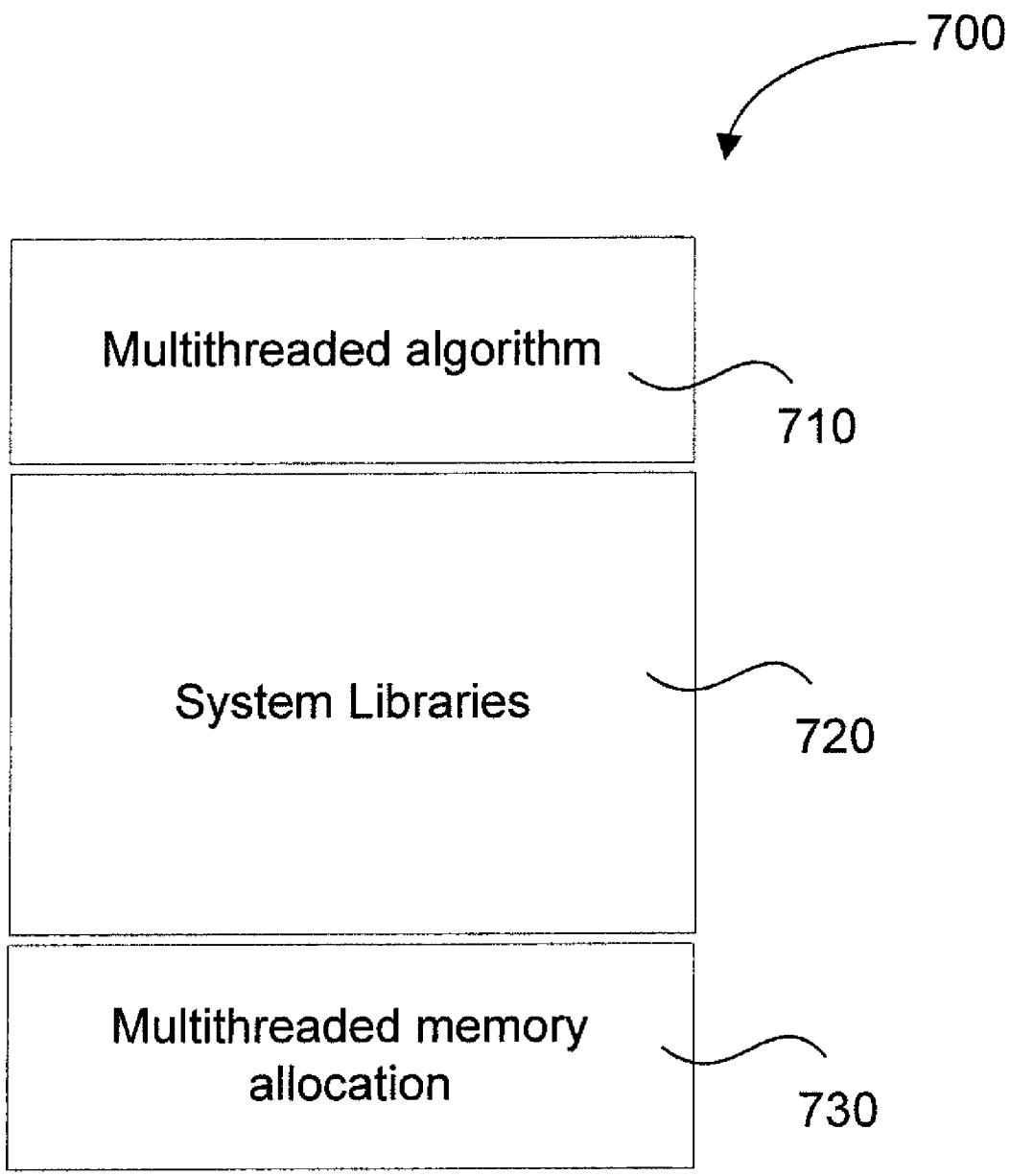
FIG. 7 illustrates a general architecture of the multithreaded algorithm, in one embodiment of the invention.

A general architecture of a processor 700 with an embedded multithreaded algorithm is illustrated in FIG. 7. The multithreaded algorithm 710 includes logic that allows parallel processing of various nodes and edges associated with a plurality of components identified in a chip design. The multithreaded algorithm 710 is located within the processor 700 and is configured to interact with various system resources such as system libraries 720 and memory allocation modules 730 available to the processor 700. The multithreaded algorithm uses information from a plurality of input files, such as netlist files, parasitic data files, design models available at the system libraries 720 to arrive at the waveform graph. In order for the multithreaded algorithm to perform parallel processing of the nodes within the chip circuit and to obtain maximum runtime benefit, the system resources, such as system libraries and multithreaded memory allocation, are configured to perform multithreading operations. With the above general architecture of a multithreaded algorithm in mind, various method operations for executing a multithreaded algorithm to perform a static timing analysis of a chip will now be described.

Figure 8:
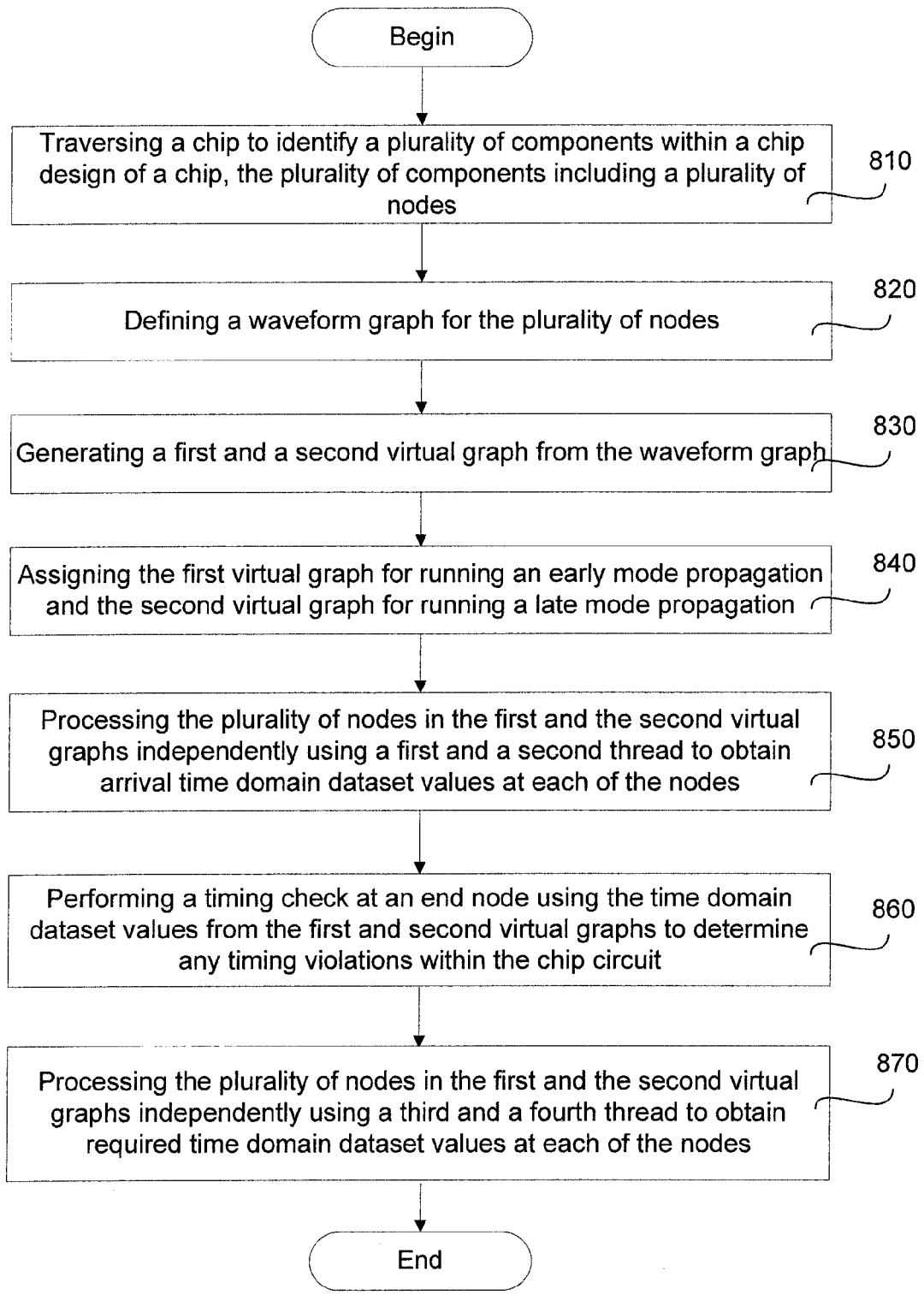
FIG. 8 illustrates flowchart of operations involved in executing a multithreaded algorithm to perform a static timing analysis of a chip, in one embodiment of the invention.

FIG. 8 illustrates an overview of the process operations involved in executing multithreaded algorithm to perform a mode-wise static timing analysis of a chip, in one embodiment of the invention. The process begins with operation 810 wherein the chip design is analyzed to identify a plurality of components. An algorithm traverses the chip to identify the different components that make up the chip design. Each component may include a plurality of nodes and interconnections between the nodes. The nodes may define an input or an output pin and the interconnections may define the propagation edges over which the signals are transmitted between nodes. A waveform graph is defined for the plurality of nodes in the chip circuit, as illustrated in operation 820. The waveform graph identifies paths over which data and clock signals are propagated in the chip circuit. A first virtual graph and a second virtual graph are generated from the waveform graph, as illustrated in operation 830. The first virtual graph is assigned to exclusively run an early mode propagation of signals and the second virtual graph is assigned to exclusively run a late mode propagation, as illustrated in operation 840. The plurality of nodes in each of the first and second virtual graphs are processed using distinct threads to obtain arrival time domain dataset values at each node, as illustrated in operation 850. After processing of all the nodes in each of the first and second virtual graphs is completed, a timing check is performed at end nodes in the first and second virtual graphs by exchanging time domain dataset values to determine any timing violations within the chip circuit, as illustrated in operation 860. The algorithm is further used in computing required time at the first and the second virtual graphs. This is done by inverting the waveform graph in the first and second virtual graph and computing required time at each node by propagating backwards using multiple threads, as illustrated in operation 870. By using distinct threads to perform early mode and late mode propagation, substantial savings in time during timing analysis is achieved. Also, by using the multithreaded feature of a processor, substantially less computation resources are utilized while saving considerable analysis time.

Figure 9:
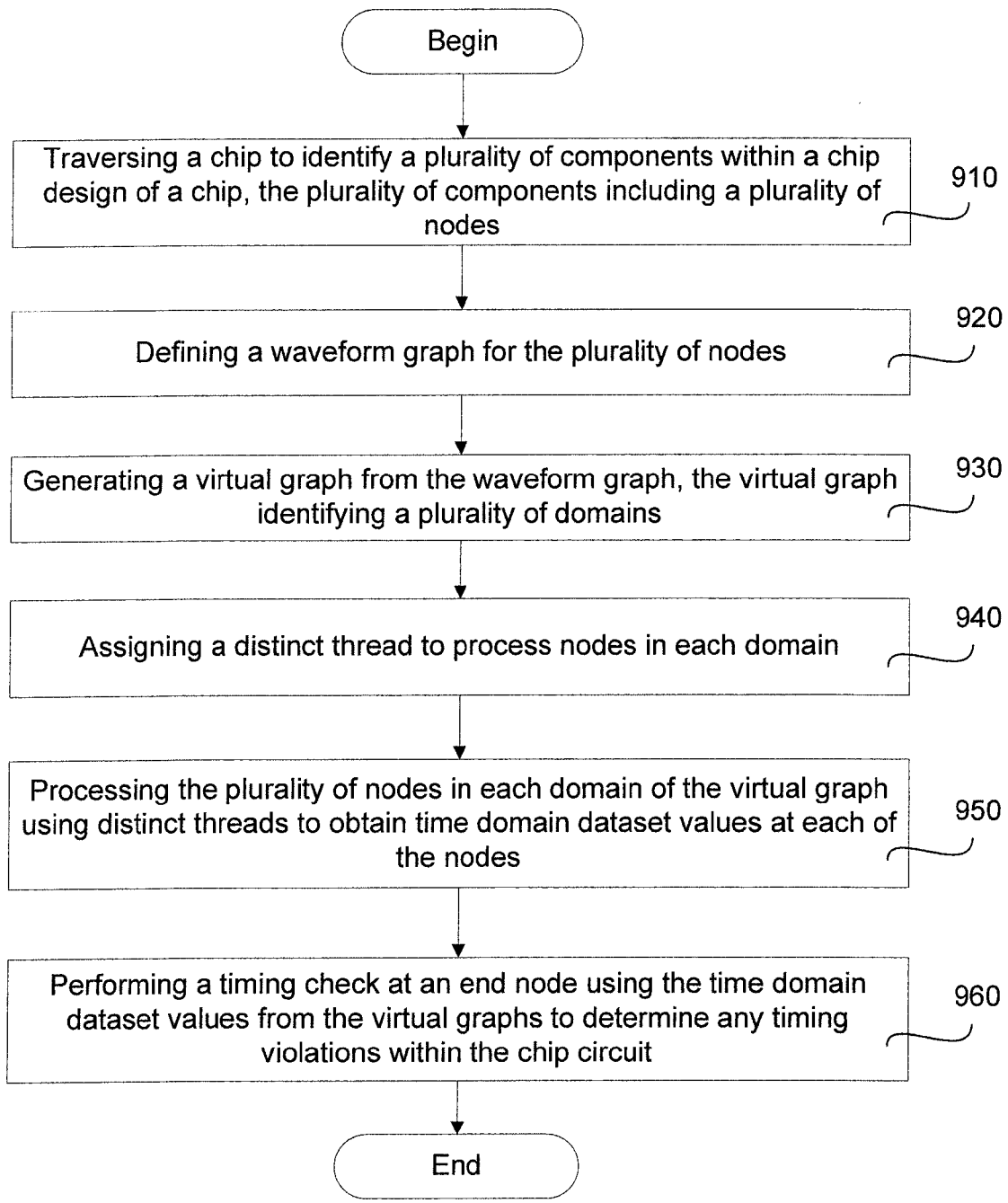
FIG. 9 illustrates flowchart of operations involved in executing a multithreaded algorithm to perform a static timing analysis of a chip, in another embodiment of the invention.

FIG. 9 illustrates the process operation involved in executing multithreaded algorithm for performing a static timing analysis of a chip, in another embodiment of the invention. An algorithm is used to traverse a logic design of a chip to identify a plurality of components and the associated nodes and propagation edges, as illustrated in operation 910. A waveform graph is defined for the plurality of nodes in the chip, as illustrated in operation 920. A virtual graph identifying one or more domains is generated, as illustrated in operation 930. Each domain includes a plurality of nodes identifying a unique path of transmission of the waveform from a clock header node. An algorithm is used to assign a distinct thread to process the nodes in each domain of the virtual graph, as illustrated in operation 940. The domains are processed using the assigned threads to obtain time domain dataset values for each of the nodes in the domains, as illustrated in operation 950. The processing of the nodes includes computing arrival times and required times at each node. The parallel processing of nodes results in a considerable reduction of time in computing the arrival times and required times for all nodes thereby shrinking the overall time used to perform static timing analysis. Upon completion of processing of all the nodes in all the domains using multiple threads, a timing check is performed at the end nodes along a timing check edge by comparing the arrival time of a data signal at an end data node against the arrival of a clock signal at an end clock node, as illustrated in operation 960. The timing check is done to determine any timing violations within the chip circuit.

Figure 10:
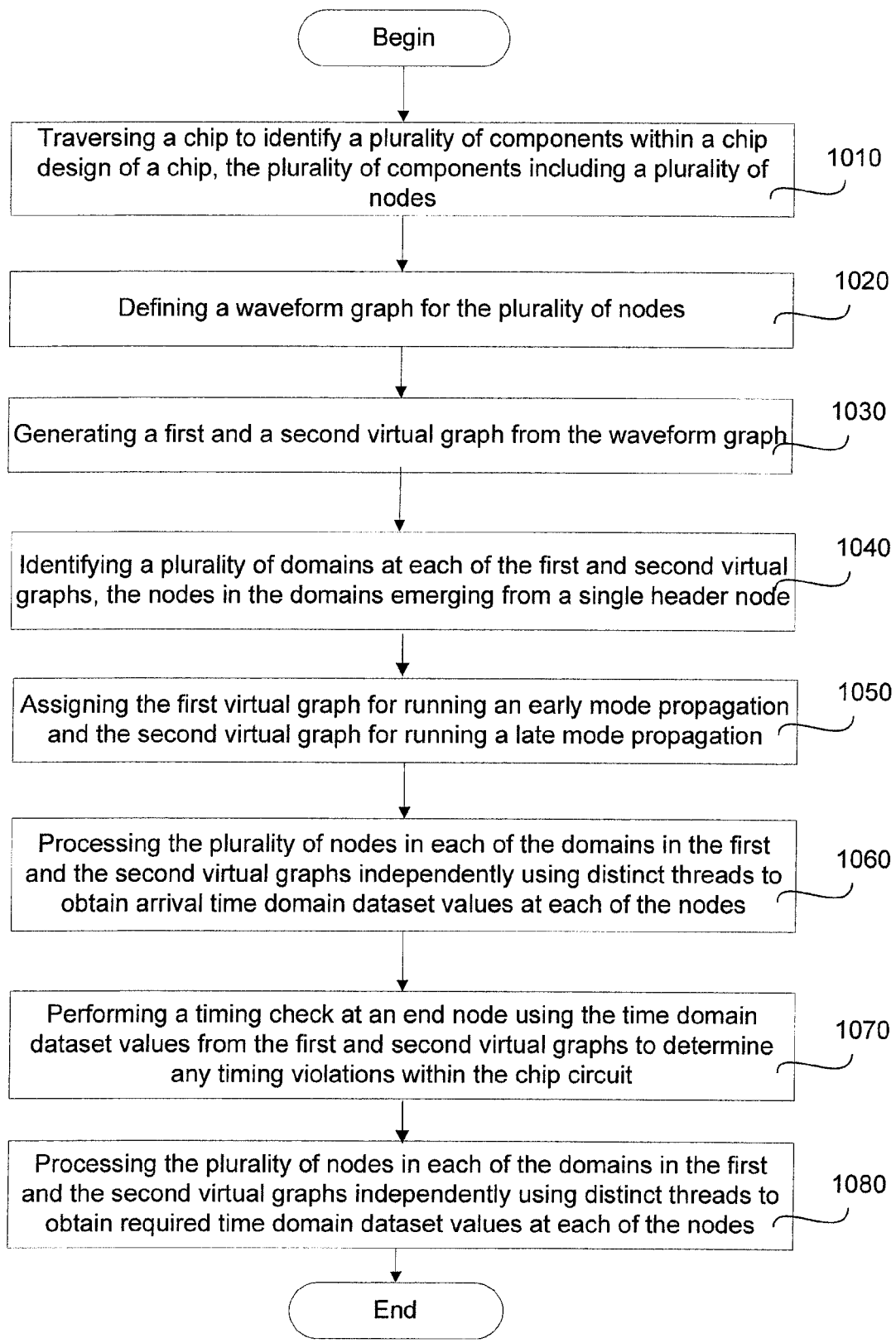
FIG. 10 illustrates flowchart of operations involved in executing a multithreaded algorithm to perform a static timing analysis of a chip, in yet another embodiment of the invention.

FIG. 10 illustrates process operations involved in executing multithreaded algorithm for performing a static timing analysis of a chip, in an alternate embodiment of the invention. The method begins by traversing the chip to identify a plurality of components within a chip circuit of the chip, as illustrated in operation 1010. Each of the components includes a plurality of nodes. A waveform graph is defined for the plurality of nodes, as illustrated in operation 1020. A first virtual graph and a second virtual graph are generated from the waveform graph, as illustrated in operation 1030. The first and second virtual graphs are generated in such a way so as to identify a plurality of domains within each of the virtual graphs, as illustrated in operation 1040. Each of the domains includes a plurality of nodes identifying a distinct transmission path followed by a waveform signal from a header node within the domain. The first virtual graph is assigned to exclusively run a early mode propagation and a second virtual graph is assigned to exclusively run a late mode propagation, as illustrated in operation 1050. The nodes in each of the domains in the first and second virtual graph are all processed simultaneously using distinct threads, to compute arrival times as illustrated in operation 1060. After all the nodes in all the domains in both the first and second virtual graphs have been processed using forward propagation, a timing check is performed at end nodes in the first and the second virtual graphs by exchanging timing information between the first virtual graph's end node and second virtual graph's end node, as illustrated in operation 1070. After the timing check is performed, the virtual graphs are reversed and a required time at the end node is computed and backward propagation is performed to compute the required time from the end node towards the clock header node to determine the required time, as illustrated in operation 1080. It should be noted that only one set (quadruplet) of required times is computed as the times are independent of domains. As mentioned earlier, the multithreaded algorithm fully utilizes the multithread feature of a processor to run timing analysis on a chip circuit of a chip in substantially less amount of time and uses less computational resources while providing results for different corner cases to enable accurate analysis of the chip circuit.

Thus, the embodiments of the invention define methods and apparatus for executing a multithreaded algorithm that takes considerably less time to perform a static timing analysis by incorporating parallel processing of nodes for different modes of propagation for different corner cases.

It will be obvious, however, to one skilled in the art, that the present invention may be practiced without some or all of these specific details. In other instances, well known process operations have not been described in detail in order not to unnecessarily obscure the present invention.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for executing a multithreaded algorithm to perform a static timing analysis of a chip, comprising:

traversing the chip to identify a plurality of components within a logic circuit of the chip, each of the plurality of components including a plurality of nodes;

defining a waveform graph for the plurality of nodes;

generating a first and a second virtual graph from the waveform graph;

assigning the first virtual graph for running an early mode propagation;

assigning the second virtual graph for running a late mode propagation;

processing the plurality of nodes in the first and the second virtual graphs independently using a first and a second thread to compute arrival time domain dataset values at each of the plurality of nodes;

performing a timing check at end point nodes in each of the first and the second virtual graphs using the time domain dataset values to determine any timing violations within the chip circuit; and processing the plurality of nodes in the first and the second virtual graphs independently using a third and a fourth thread to compute required time domain dataset values at each of the plurality of nodes, wherein operations are executed by a processor.

2. The method of claim 1, wherein the processing further including, a. identifying a corner case; and b. computing arrival time and required time domain dataset values for each of the nodes in the first and second virtual graphs for the identified corner case, wherein the timing check is performed for the corner case after the computation of the arrival time at each of the plurality of nodes and prior to the computation of the required time at each of the plurality of nodes.

3. The method of claim 1, wherein performing a timing check further including, identifying end point nodes in each of the first and second virtual graphs; and performing the timing check at the end point nodes using cross computation to determine any timing violation within the chip circuit of the chip, wherein the cross computation is performed by exchanging timing information associated with the end point nodes of the first virtual graph and the end point nodes of the second virtual graph, the timing information including time domain dataset values.

4. A method for executing a multithreaded algorithm to perform a static timing analysis of a chip, comprising:

traversing the chip to identify a plurality of components within a logic circuit of the chip, each of the plurality of components including a plurality of nodes;

defining a waveform graph for the plurality of nodes;

generating a first and a second virtual graph from the waveform graph;

assigning the first virtual graph for running an early mode propagation;

assigning the second virtual graph for running a late mode propagation;

processing the plurality of nodes in the first and the second virtual graphs independently using a plurality of threads to compute time domain dataset values at each of the plurality of nodes; and performing a timing check at end nodes in each of the first and the second virtual graphs using the time domain dataset values to determine any timing violations within the chip circuit, wherein operations are executed by a processor.

5. The method of claim 4, wherein obtaining the time domain dataset values further including, capturing independent waveform information representing different time domain dataset values associated with each of early mode propagation and late mode propagation at each node, wherein the waveforms associated with early mode propagation provides information related to minimum rise, minimum fall, and wherein the waveforms associated with late mode propagation provides information related to maximum rise and maximum fall.

6. The method of claim 4, wherein the processing further including, identifying a corner case; and computing time domain dataset values for each of the nodes in the first and second virtual graphs for the identified corner case.

7. The method of claim 6, wherein each node is associated with a plurality of time domain dataset values for the corner case.

8. The method of claim 4, wherein performing a timing check further including, identifying end point nodes in each of the first and second virtual graph; and performing the timing check at the end point nodes using cross computation to determine any timing violation within the chip circuit of the chip.

9. The method of claim 8, wherein cross computation is performed by exchanging timing information associated with the end point nodes of the first virtual graph and the end point nodes of the second virtual graph, the timing information including time domain dataset values.

10. The method of claim 6, wherein the time domain dataset values for each node depends on the time domain dataset values of a corresponding preceding node in each of the first and second virtual graphs for the corner case.

11. The method of claim 4, wherein the processing of the plurality of nodes includes a forward propagation processing and a backward propagation processing, the forward propagation processing computing an arrival time and the backward propagation processing computing a required time at each node of the first and second virtual graph.

12. The method of claim 11, wherein the forward propagation processing or the backward propagation processing at the first and second virtual graphs is performed concurrently using multiple threads.

13. The method of claim 11, wherein forward propagation processing and backward propagation processing at the first or second virtual graph is performed sequentially.

14. The method of claim 13, wherein forward propagation processing and backward propagation processing at each of the first or second virtual graph is performed using distinct threads.

15. The method of claim 4, wherein generating a virtual graph further including, tagging the time domain dataset value associated with each node with a buffer information of a clock header node from which the node emerged.

16. The method of claim 15, wherein the processing of the nodes further including, detecting a convergence node at the first and second virtual graphs for the corner case where a plurality of nodes converge, each of the plurality of nodes converging at the convergence node emerging from a single clock header node;

identifying a worse time domain dataset value at the convergence node by comparing the time domain dataset values associated with each of the converging nodes in the first and second virtual graph;

retaining the identified worse time domain dataset value at the convergence node; and pruning the remaining time domain dataset values at the convergence node in the first and second virtual graphs, wherein the pruning is done based on the tag associated with the time domain dataset values for respective node of the first and second virtual graphs.

17. A method for executing a multithreaded algorithm to perform a static timing analysis of a chip, comprising:

traversing the chip to identify a plurality of components within a chip circuit of the chip, each of the plurality of components including a plurality of nodes;

defining a waveform graph for the plurality of nodes;

generating a virtual graph identifying one or more domains in the waveform graph, each of the domains representing a unique transmission path from a clock header node through plurality of nodes associated with the clock header node of the waveform graph;

processing the plurality of nodes in each of the domains in the virtual graph using multiple threads to obtain time domain dataset values at each node, each thread assigned to process the plurality of nodes in each domain; and performing a timing check to determine any timing violation within the chip circuit, wherein operations are executed by a processor.

18. The method of claim 17, wherein the processing further including, identifying a corner case; and computing time domain dataset values for each of the nodes in each of the domains of the virtual graph for the identified corner case.

19. The method of claim 18, wherein generating a virtual graph further including, tagging each of the time domain dataset values at each node with a buffer information of a clock header node associated with the node, the tagging identifying the domain of the virtual graph to which the node belongs.

20. The method of claim 19, wherein processing the plurality of nodes further including, detecting a convergence node where a plurality of nodes of a domain converge in the virtual graph, each of the plurality of nodes converging at the convergence node emerging from a single clock header node of the domain;

identifying a worse case time domain dataset value at the convergence node by comparing the time domain dataset values associated with each of the converging nodes in the virtual graph;

retaining the identified worse case time domain dataset value at the convergence node; and pruning the remaining time domain dataset values at the convergence node in the virtual graph, wherein the pruning is done based on the tag associated with each of the time domain dataset values at the convergence node within the domain of the virtual graph.

21. The method of claim 17, wherein the processing of the plurality of nodes includes a forward propagation processing to compute an arrival time and a backward propagation processing for computing a required time at each node and wherein the forward propagation processing of the domains performed concurrently using multiple threads after propagation of a clock domain associated with the virtual graph.

22. A method for executing a multithreaded algorithm to perform a static timing analysis of a chip, comprising:

traversing the chip to identify a plurality of components with in a chip circuit of the chip, each of the plurality of components including a plurality of nodes;

defining a waveform graph for the plurality of nodes;

generating a first and second virtual graphs from the waveform graph;

defining one or more domains within each of the first and second virtual graphs, each of the domains representing a signal transmission path through plurality of nodes associated with a single header node at the first and second virtual graphs;

assigning the first virtual graph for running an early mode propagation;

assigning the second virtual graph for running a late mode propagation;

processing the plurality of nodes in each of the domains in the first and the second virtual graphs independently using a plurality of threads to obtain time domain dataset values at each of the plurality of nodes, each of the plurality of threads assigned to process a domain; and performing a timing check at the first and second virtual graphs to determine any timing violations within the chip circuit, wherein operations are executed by a processor.

23. The method of claim 22, wherein the processing further includes a forward propagation processing to compute an arrival time and a backward propagation processing to compute a required time at each node.

24. The method of claim 23, wherein the processing further including propagating a clock domain at each of the first and the second virtual graphs prior to forward propagation processing and backward propagation processing.

25. The method of claim 22, wherein the processing further including, identifying a corner case; and computing time domain dataset values for each of the nodes in the first and second virtual graphs for the identified corner case, the time domain dataset values from the first virtual graph associated with early mode propagation and the time domain dataset values from the second virtual graph associated with late mode propagation.

26. The method of claim 22, wherein the processing of the nodes further including, detecting a convergence node wherein a plurality of nodes of a domain within the first and the second virtual graphs converge, each of the plurality of nodes converging at the convergence node within the domain emerging from a single clock header;

identifying a worse case time domain dataset value at the convergence node by comparing the time domain dataset values associated with each of the converging nodes of the domain in the first and second virtual graph;

retaining the identified worse case time domain dataset value at the convergence node; and pruning the remaining time domain dataset values at the convergence node in the domain in each of the first and the second virtual graphs, wherein the pruning is done based on a tag associated with the time domain dataset values for the respective node in the domain of the first and second virtual graphs.

* * * * *